(12) United States Patent
Kohlmann

(10) Patent No.: US 12,078,609 B2
(45) Date of Patent: Sep. 3, 2024

(54) SYSTEM AND METHOD FOR MEASURING A VARIABLE OF A LIQUID

(71) Applicant: Endress+Hauser Inc., Greenwood, IN (US)

(72) Inventor: Fred Kohlmann, Sussex, WI (US)

(73) Assignee: Endress+Hauser Inc., Greenwood, IN (US)

( * ) Notice: Subject to any disclaimer, the term of this patent is extended or adjusted under 35 U.S.C. 154(b) by 148 days.

(21) Appl. No.: 17/130,874

(22) Filed: Dec. 22, 2020

(65) Prior Publication Data

US 2022/0196587 A1 Jun. 23, 2022

(51) Int. Cl.
*G01N 27/30* (2006.01)
*G01N 27/333* (2006.01)
*G01N 27/406* (2006.01)
*G01N 27/409* (2006.01)

(52) U.S. Cl.
CPC ......... *G01N 27/301* (2013.01); *G01N 27/333* (2013.01); *G01N 27/4062* (2013.01); *G01N 27/409* (2013.01)

(58) Field of Classification Search
CPC ............... G01N 27/301; G01N 27/333; G01N 27/4062; G01N 27/409
See application file for complete search history.

(56) References Cited

U.S. PATENT DOCUMENTS

| | | | | |
|---|---|---|---|---|
| 5,162,077 | A | * 11/1992 | Bryan | G01N 27/38 204/402 |
| 2005/0194296 | A1 | * 9/2005 | Lin | G01N 27/4167 210/85 |
| 2006/0169033 | A1 | * 8/2006 | Discenzo | G01N 33/2888 73/53.01 |

(Continued)

FOREIGN PATENT DOCUMENTS

| | | | |
|---|---|---|---|
| CN | 203275126 U | * 11/2013 | |
| KR | 20000028672 A | * 5/2000 | |

(Continued)

OTHER PUBLICATIONS

Cho et al., English translation of KR20000028672A, 2000 (Year: 2000).*

(Continued)

*Primary Examiner* — Luan V Van
*Assistant Examiner* — Shizhi Qian
(74) *Attorney, Agent, or Firm* — Christopher R. Powers; Endress+Hauser (USA) Holding, Inc.

(57) ABSTRACT

A system for measuring a variable of a liquid and a method operation the system is disclosed. The system comprises: a sensor located on an end section of an elongated sensor support and embodied to measure the variable; a containment device that is open at the top; the containment device including: a bottom section given by a liquid impermeable retainment basin, a top section having a side wall surrounding an interior of the top section and apertures extending (Continued)

through the side wall of the top section; and fasteners embodied to at a measurement site mount the sensor support in a fixed sensor support position in relation to a fixed device position of the containment device such that the sensor is located inside the retainment basin.

17 Claims, 3 Drawing Sheets

(56) References Cited

U.S. PATENT DOCUMENTS

| | | | | |
|---|---|---|---|---|
| 2007/0144919 | A1* | 6/2007 | Cheng | G01N 27/333 |
| | | | | 205/789 |
| 2015/0241402 | A1* | 8/2015 | Dooley | G01N 33/18 |
| | | | | 73/61.41 |
| 2017/0227391 | A1* | 8/2017 | Forster-Knight | G08B 21/182 |
| 2019/0011393 | A1* | 1/2019 | Fanselow | G01N 21/8507 |
| 2019/0154196 | A1* | 5/2019 | Lambe | G01F 1/66 |

FOREIGN PATENT DOCUMENTS

| | | | |
|---|---|---|---|
| KR | 20090097250 A | * | 9/2009 |
| KR | 20090100053 A | * | 9/2009 |
| WO | WO2012172538 A1 | * | 12/2012 |

OTHER PUBLICATIONS

Jung et all., English translation of KR20090097250A, 2009. (Year: 2009).*

Li et al., English translation of CN-203275126-U, 2013 (Year: 2013).*

Medotec GmbH, Measuring & Control Technology, Assessories for Measuring & Control Technology, https://www.medotec.de/en/products/measuring-control-technology/accessories-for-measuring-control-technology/immersion-fitting.html, last accessed Dec. 18, 2020, 3 pp.

* cited by examiner

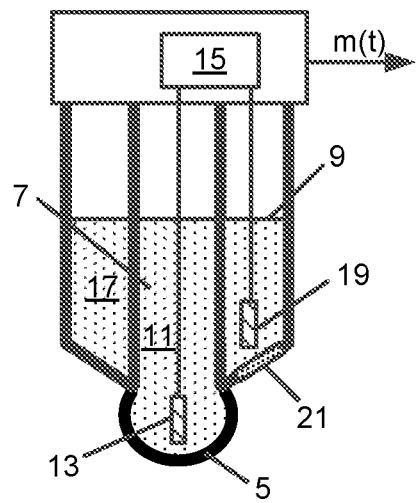
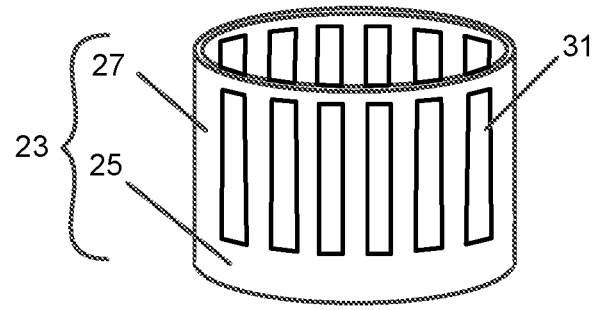
Fig. 3
Fig. 4
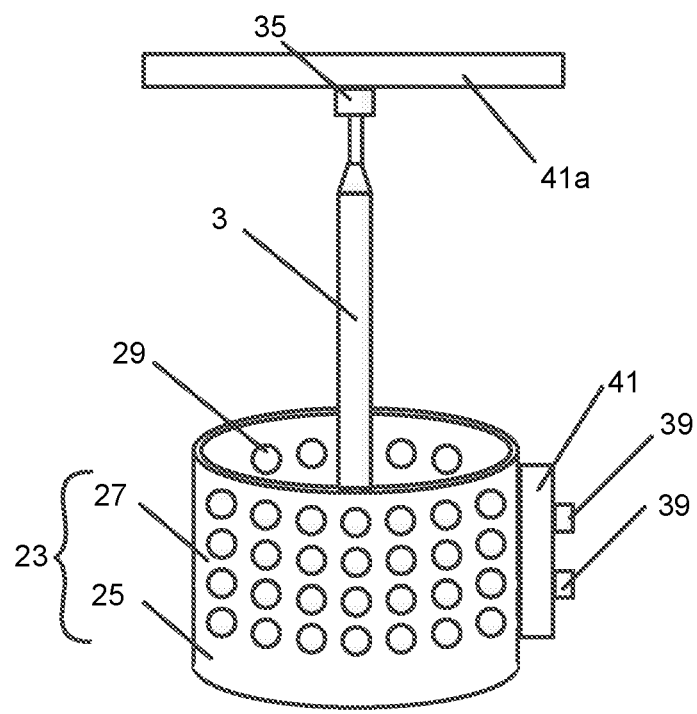
Fig. 5

SYSTEM AND METHOD FOR MEASURING A VARIABLE OF A LIQUID

TECHNICAL FIELD

The present disclosure relates to systems and methods for measuring a variable of a liquid at a measuring site such that a sensor is maintained in a wet environment.

BACKGROUND

Sensors for measuring a variable of a liquid are used in a large variety of different applications. These application include industrial applications, applications in water or waste water treatment or processing plants, in sewage systems, as well as in sewage treatment plants, biotechnological applications and applications in laboratories. Measurement results provided by these sensors are, e.g., employed to monitor, regulate and/or control a process performed at a measurement site and/or in context with quality control schemes employed to ensure that the value of the variable is within a predetermined value range and/or to issue a warning or an alarm when the value of the variable exceeds the value range.

Various different types of sensors for measuring a variety of different variables are known in the art. Most of these sensors include at least one sensor element that must be immersed in the liquid during measurement. Examples include electrochemical sensors, e.g., potentiometric sensors employed to measure variables, e.g., an activity or a concentration of an analyte contained in the liquid or a pH-value of the liquid, amperometric sensors, e.g., sensors employed to measure dissolved oxygen, and sensors for measuring an oxidation reduction potential of the liquid. These sensors commonly include sensor elements, e.g., membranes or ion-selective membranes that must be immersed in the liquid during the measurement. In most cases, these sensor elements constitute key components of these sensors and their properties are relevant factors with respect to the quality, measurement accuracy and performance of these sensors.

There is a fair number of applications in which it is either very difficult or even impossible to install these sensors such that their sensor elements are always immersed in the liquid. These applications include measurements performed at measurement sites where a level of the liquid may change in relation to the position of the sensor. As an example, a production process performed at the measurement site may require for a container containing the liquid to be regularly filled and/or emptied. As another example, a weir or a sewer holding the liquid may sometimes run dry.

Every time the sensor element is no longer immersed in the liquid, the sensor element starts to dry. When this condition prevails over a longer period of time, the sensor element may dry out completely. When a sensor element embodied to be operated in a wet environment, e.g., an ion-selective membrane, repeatedly wets and dries or eventually dries out, this may lead to an irreversible change of the properties of the sensor element, e.g., electrochemical properties of a membrane, which in turn may have a negative effect on the quality, measurement accuracy and performance of the sensor.

To overcome this problem, the company MEDOtec GmbH in Monchengladbach in Germany offers an elongated sensor support equipped with a wet holding bowl for keeping a sensor located on an end section of the sensor support in a wet environment. The bowl is pivotably mounted on a pivoting axis extending through an end section of the sensor support in a direction perpendicular to a longitudinal axis of the sensor support. In addition, a float is attached to an upper outside edge of the bowl located spaced apart from the longitudinal axis on one of the two opposite sides of the bowl. When the sensor support is immersed in a liquid, the buoyancy of the float causes the bowl to pivot to one side of the longitudinal axis of the sensor support such that the sensor located at the end of the sensor support is exposed. When a level of the liquid drops, gravity causes the bowl to pivot back to a center position such that the sensor at the end of the sensor support is immersed in the liquid contained inside the bowl. The pivoting bowl provides that the sensor located at the end of the sensor support is usually immersed in the liquid.

Though this constitutes a solution for many applications, problems may arise in application, for example, where the pivoting mechanism may be exposed to harsh conditions, which may impair or even block the pivoting mechanism. As an example, a build-up of deposits on the pivoting mechanism or corrosion may prevent the bowl from pivoting freely. Another example are applications, e.g., measurements of variables of liquids in sewers or weirs, where debris, like rags, strings, fibers, sticks or other objects, carried along by the liquid could get caught between the sensor support and the bowl and/or between the sensor and the bowl. This may block the pivoting mechanism. When the level of the liquid drops a blockage may prevent the bowl from pivoting back to the center position. In consequence, the sensor will be exposed to ambient conditions causing the sensor to dry.

Accordingly, there remains a need for further contributions in this area of technology.

As an example, there is a need for a system capable of keeping a sensor for measuring a variable of a liquid in a wet environment that is less susceptible to harsh environment conditions.

As another example, there is a need for a system that is less susceptible to impairments caused by deposits, corrosion or debris.

SUMMARY

The present disclosure includes a system for measuring a variable of a liquid, the system comprising:

a sensor located on an end section of an elongated sensor support and embodied to measure the variable;

a containment device that is open at the top, the containment device including:

a bottom section given by a liquid impermeable retainment basin;

a top section having a side wall surrounding an interior of the top section;

apertures extending through the side wall of the top section; and fasteners embodied to at a measurement site mount the sensor support in a fixed sensor support position in relation to a fixed device position of the containment device such that the sensor is located inside the retainment basin.

Embodiments of the present disclosure provide an advantage that, once the retaining basin has at least once been filled with liquid, the liquid retained in the retainment basin when a level of the liquid prevailing at the measurement site drops below an upper edge of the retainment basin ensures that the sensor remains immersed in a wet environment.

When additional liquid is supplied to the measurement site from a source located above the containment device when the level of the liquid is below the upper edge of the retainment basin, the containment device being open at the top, provides the advantage that the liquid dropping into the retainment basin will essentially replace at least some or even all liquid previously retained in the retainment basin. At the same time, the apertures enable any excess liquid to exit the containment device. This provides the advantage that the retainment basin is flushed and that the sensor is exposed to the newly supplied liquid without requiring the level of the liquid to rise above the upper edge of the retainment basin corresponding to a lower edge of the lowest aperture(s).

When the level does rise above the lower edge of the lowest aperture(s) corresponding to the upper edge of the retainment basin, the apertures provide the advantage that liquid is exchanged between the retainment basin and a surrounding of the containment device through the apertures. This exchange of liquid is continuous, even when the containment device is fully immersed in the liquid, and provides the advantage that it enables the sensor to measure the variable of the liquid surrounding the containment device.

Another advantage is that the system is very robust. This is in particular due the fixed sensor support position of the sensor support and the fixed device position of the containment device during operation of the system. Thus, neither movable parts nor mechanism enabling movements of movable parts, which might be impaired by harsh conditions, build up, corrosion or debris, are required.

In an embodiment, the apertures include at least one of: at least one hole, at least one slot, at least one horizontal slot, at least one vertical slot and apertures of a grid constituting at least a fraction of the side wall of the top section.

In another embodiment, the apertures are distributed over a height and a circumference of the side wall of the top section.

In another embodiment, the containment device is a container, a bucket, a box, a square box or a rectangular box; a volume of an interior of the containment device is larger or equal to 5 liters and/or smaller or equal to 50 liters; the containment device has a cross-sectional area of $0.05\ m^2$ to $0.5\ m^2$; and/or the probe support is a tube, a pipe or a rod supporting the sensor attached thereto.

In another embodiment, the containment device is a metal container, a stainless steel container or a plastic container.

In another embodiment, a height of the retainment basin exceeds a height of a front end of the sensor that needs to be immersed in the liquid during measurement by at least a minimum distance, by at least a minimum distance of 2 cm or by at least a minimum distance of 5 cm.

In another embodiment, a height of the top section is larger or equal to a height of the retainment basin.

In another embodiment, the sensor includes a sensor element, a membrane or an ion-selective membrane embodied to be operated in a wet environment and embodied to be exposed to the liquid during measurement.

In another embodiment, the sensor is an electrochemical sensor, a potentiometric sensor, an amperometric sensor, a sensor or a potentiometric sensor measuring an activity or a concentration of an analyte contained in the liquid, a sensor or a potentiometric sensor measuring a pH-value of the liquid, a sensor or an amperometric sensor measuring a concentration of dissolved oxygen or a sensor measuring an oxidation reduction potential of the liquid.

In another embodiment, the system additionally includes: at least one additional sensor located on an end section of an additional elongated sensor support; wherein each additional sensor is embodied to measure an additional variable of the liquid; and at least one fastener for each additional sensor support embodied to mount the respective additional sensor support in a fixed sensor support position in relation to the fixed device position of the containment device such that the additional sensor located on the end section of the respective additional sensor support is located inside the retainment basin.

The present disclosure further includes a method of operating the system disclosed at a measurement site, the method comprising the steps of: installing the sensor support at the fixed sensor support position at the measurement site and installing the containment device at the fixed device position at the measurement site such that the sensor is located inside the retainment basin; during or following the installation, at least once filling the containment device or at least the retainment basin with liquid; measuring the variable of the liquid using the sensor; and providing a corresponding measurement result.

In an embodiment of the method, installing the sensor support includes: mounting the sensor support onto a suspension beam mounted onto a site support provided at the measurement site, or mounting the sensor support onto a site support located above a measurement position, where the measurements are to be performed by the sensor; and installing the containment device, which includes: mounting, screwing or welding the containment device onto a site support provided at the measurement site such that the site support is located to one side of the containment device; or mounting, screwing or welding the containment device onto a top side of a site support or a top side of a base, a floor or a concrete floor of a tank or another type of vessel or container; or positioning the containment device on a top side or in a recess of a site support or a liquid permeable grid such that the containment device in held in place in the fixed device position either by gravity or by gravity and the shape of the site support.

In another embodiment of the method, the sensor support is installed at the fixed sensor support position such that the sensor is spaced apart from a base of the retainment basin by a distance larger or equal to a minimum distance, by a distance larger or equal to a minimum distance of 2 cm or by a distance larger or equal to a minimum distance of 5 cm.

In another embodiment, the method further comprises the steps of: at least once exchanging at least some or all of the liquid retained in the retainment basin while a level of the liquid at the measurement site is below the containment device by supplying liquid to the measurement site from a source located above the containment device such that the supplied liquid drops into the containment device; and measuring the variable of the supplied liquid using the sensor.

In another embodiment, the method further comprises the step of the sensor at least once measuring the variable of the liquid while the containment device is immersed in the liquid and liquid is exchanged between the retainment basin and a surrounding of the containment device through the apertures.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIG. 3 shows a sensor;

FIG. 4 shows an alternative embodiment of a containment device;

FIG. 5 shows a system at a measurement site having its sensor support mounted onto a site support located above a containment device of the system;

DETAILED DESCRIPTION

Figure 1:
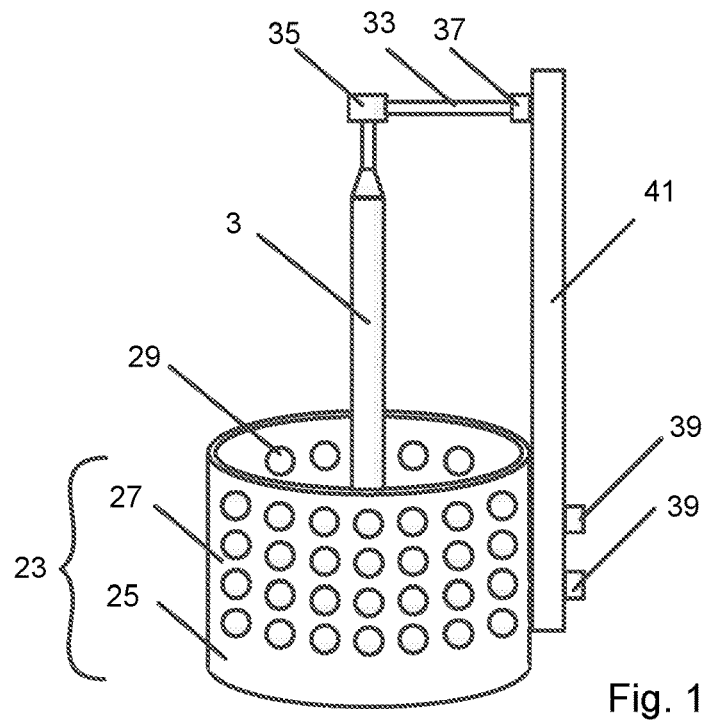
FIG. 1 shows a view of a system for measuring a variable of a liquid.

The present disclosure includes a system for measuring a variable of a liquid and a method of operating the system. A view of an exemplary system installed at a measurement site is shown in FIG. 1, and a cross-sectional view of this system is shown FIG. 2.

Figure 2:
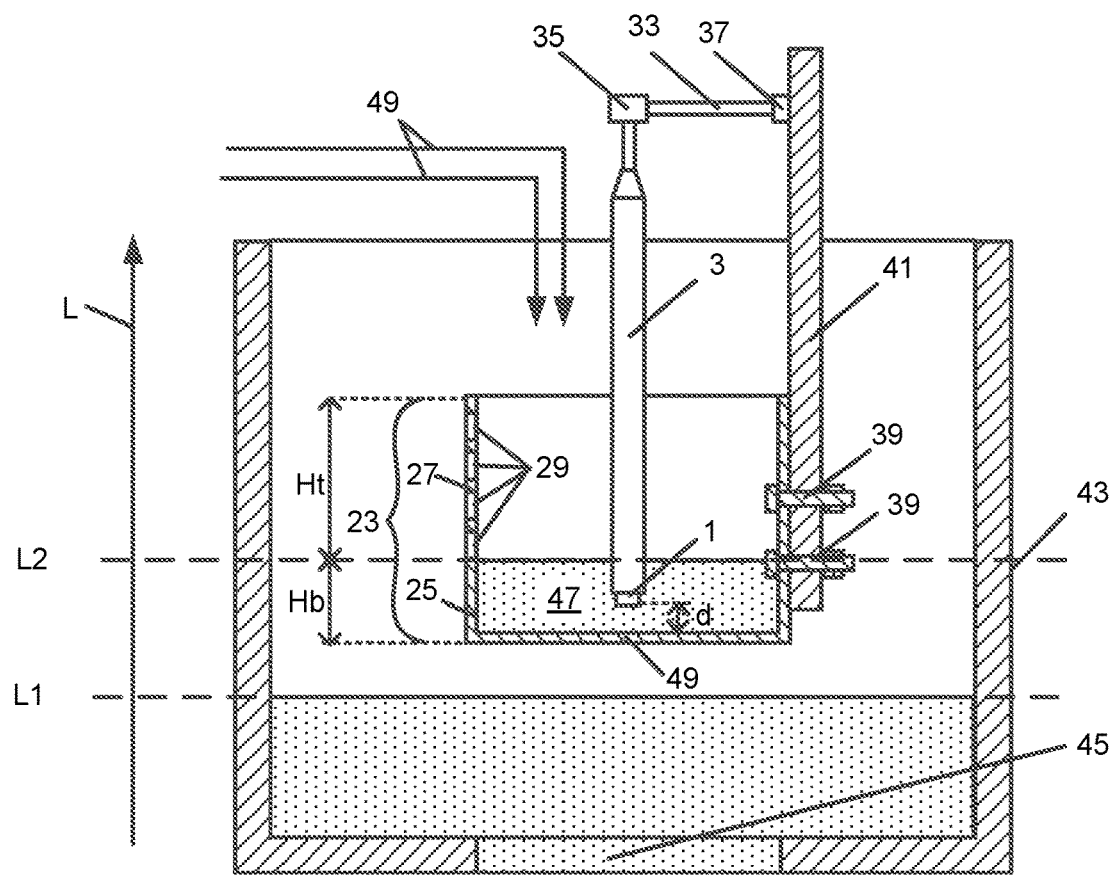
FIG. 2 shows a cross-sectional view of the system of FIG. 1.

The system includes a sensor 1 embodied to measure the variable. As shown in FIG. 2, the sensor 1 may be located on an end section of an elongated sensor support 3.

As an example, the sensor support 3 is, e.g., a tube, a pipe or a rod having the sensor 1 attached to it.

The sensor 1 may include a sensor element 5, e.g., a membrane embodied to be operated in a wet environment and to be exposed to the liquid during the measurement. In this respect, sensors known in the art can be employed.

An example of the sensor 1 including the sensor element 5 is shown in FIG. 3. In this example the sensor 5 is, e.g., a potentiometric sensor, the variable is, e.g., an activity or a concentration of an analyte in the liquid or a pH-value of the liquid, and the sensor element 5 is, e.g., a membrane, e.g., an ion-selective membrane.

The sensor 1 shown in FIG. 3 includes a measuring cell 7 capped by the sensor element 5 given by the ion-selective membrane. As an option, the sensor 1 many additionally include a reference cell 9. The measuring cell 7 is equipped with an electrolyte 11 located inside the measuring cell 7 and an electrode 13 extending into the electrolyte 11. Thus, an inside surface of the sensor element 5 is exposed to the electrolyte 11 located inside the measuring cell 7, and an outside surface of the sensor element 5 is exposed to the liquid surrounding the sensor 1 during measurement. Due to the ion-selective interaction of the sensing element 5 given by the ion-selective membrane with the liquid, an electric measurement potential corresponding to the variable to be measured can be derived via the electrode 13. Quantitative determination of the variable is, e.g., performed by a sensor electronics 15 connected to the electrode 13 based on the measurement potential, e.g., by determining a difference between the measurement potential and a reference potential, e.g., a reference potential provided by the reference cell 9.

With respect to the optional reference cell 9, reference cells known in the art can be employed. In FIG. 3 the optional reference cell 9 is designed as a half-cell surrounding a section of the measuring cell 7. As an alternative option, the reference cell can be embodied as a separate unit. Regardless of this, the reference cell 9, e.g., includes an electrolyte 17 located inside the reference cell 9, an electrode 19 extending into the electrolyte 17 and a diaphragm 21 inserted into a wall section of the reference cell 9 such that an inner surface of the diaphragm 21 is exposed to the electrolyte 17 enclosed in the reference cell 9 and an outer surface of the diaphragm 21 is exposable to the liquid.

The invention is not limited the type of sensor shown in FIG. 3. As an alternative other sensors known in the art can be employed instead. To give some examples, the sensor 1 is, e.g., an electrochemical sensor, a potentiometric sensor, an amperometric sensor, a sensor, e.g., a potentiometric sensor, measuring an activity or a concentration of an analyte contained in the liquid, a sensor, e.g., a potentiometric sensor, measuring a pH-value of the liquid, a sensor, e.g., an amperometric sensor, measuring a concentration of dissolved oxygen, or a sensor measuring an oxidation reduction potential of the liquid.

The system further includes a containment device 23, e.g., a container that is open at the top. The containment device 23 includes a bottom section defined by a liquid impermeable retainment basin 25 and a top section 27. The top section 27 includes a side wall surrounding an interior of the top section 27 and apertures 29 extend through the side wall of the top section 27. Each aperture 29 constitutes a flow path enabling liquid to pass through the respective aperture 29 into and out of the containment device 23.

In the example shown in FIGS. 1 and 2, the apertures 29 are holes distributed over the side wall of the top section 27. FIG. 4 shows an alternative embodiment of the containment device 23, wherein the apertures 29 are slots 31 distributed over the side wall of the top section 27. In the example shown, the slots 31 are vertical slots, but horizontal slots or slots having another orientation can be employed instead or in combination with the holes 29 and/or the slots 31 shown in FIGS. 1, 2 and 4. As an alternative other types of apertures 29, e.g., apertures of a grid constituting at least a fraction of the side wall of the top section, or combinations of apertures of two or more kinds enabling liquid to enter and to exist the containment device 23, can be employed.

Regardless of the number and the shape of the apertures 29, the apertures 29 are, e.g., distributed over a height and a circumference of the side wall of the top section 27.

The system further includes fasteners embodied to mount the elongated sensor support 3 in a fixed sensor support position in relation to a fixed device position of the containment device 23 such that the sensor 1 is located inside the retainment basin 25. With respect to the fasteners, fasteners known in the art, e.g., fasteners including suspension beams, screws, bolts, clamps and/or flanges, can be applied.

FIGS. 1 and 2 show an example in which the fasteners include a suspension beam 33, a fastener 35 for mounting the sensor support 3 on the suspension beam 33 and fasteners 37, 39 for mounting the suspension beam 33 and the containment device 23 at different heights on a site support 41 provided at the measurement site. In this example shown, the sensor support 3 and the containment device 23 are both mounted on the same site support 41 extending in parallel to the sensor support 3.

Depending on the application, there may be two or more site supports available at the measurement site for this purpose. In that case, the sensor support 3 may be mounted on a different site support than the containment device 23. As an example, as shown in FIG. 5, the sensor support 3 may be mounted directly onto a site support 41a located above a measurement position, where the measurements are to be performed by the sensor 1. This provides the advantage that no suspension beam is required.

As an additional or alternative embodiment, the containment device 23 is, e.g., mounted, e.g., screwed or welded, onto a site support, e.g., the site support 41 shown in FIG.

5, which is located to one side of the containment device 23. As an alternative option, the containment device 23 is, e.g., mounted, e.g., screwed or welded, onto a top side of a site support, e.g., a base or a floor, e.g., a concrete floor, of a tank or another type of vessel or container, located underneath the containment device 23.

Figure 6:
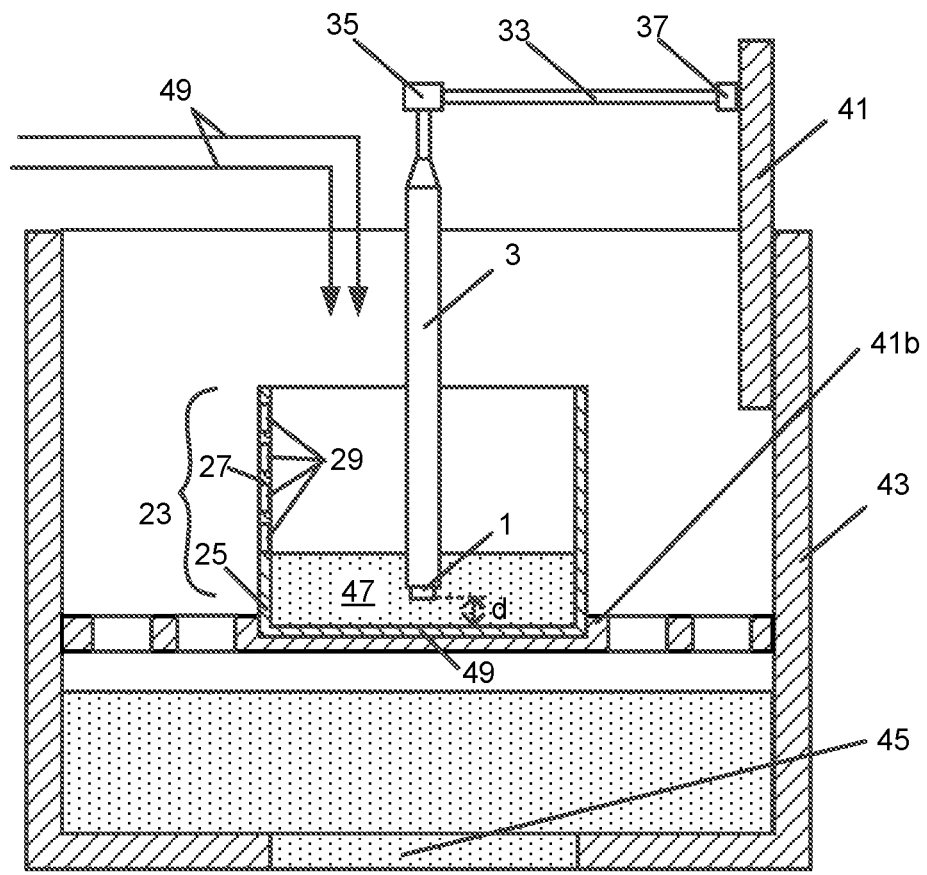
FIG. 6 shows a system at a measurement site having its containment device installed on a site support located below the containment device.

In at least one embodiment, the containment device 23 may be positioned on a top side or in a recess of a site support 41b, e.g., the liquid permeable grid shown in FIG. 6, holding the containment device 23 in the fixed device position, e.g., due to gravity and/or due to the shape of the site support 41b. In such an embodiment, the containment device 23 is, e.g., embodied such that a mass of the containment device 23 or a mass of the containment device 23 plus the liquid in the retainment basin 25 keeps the containment device in the fixed device position without fasteners connecting the containment device 23 to the site support 41b.

The present disclosure further includes a method of operating the system described above. This method includes the steps of installing the sensor support 3 at the fixed sensor support position at the measurement site and of installing the containment device 23 at the fixed device position at the measurement site such that the sensor 1 is located inside the retainment basin 25.

As shown in FIGS. 2 and 6, depending on the type of application, the measurement site may include a vessel 43, e.g., a tank, a drain, a flow channel, a pipe or another type of open or closed vessel, embodied to contain, to receive liquid and/or to release liquid. As an example liquid may be provided by a piping system and/or provided by a liquid source, e.g., a weir, a drain or a liquid reservoir, and/or released via a flow path 45 connected to the vessel 43. In such an embodiment, the containment device 23 is installed inside the vessel 43 and the sensor support 3 is secured inside or above the vessel 43 such that the sensor 1 is located inside the retainment basin 25.

During or following the installation of the system the containment device 23 or at least the retainment basin 25 is at least once filled with liquid. Following this, the sensor 1 measures the variable of the liquid surrounding it inside the retainment basin 25 and provides a corresponding measurement result, m(t). As an example, the measurement result, m(t), may be determined by the sensor electronic 15 of the sensor 1 and provided by the sensor electronic 15 in form of a measurement signal.

In a measurement situation, where the containment device 23 is initially fully immersed in the liquid, a drop of a level L of the liquid at the measurement site to a level L1 below the containment device 23 will cause liquid to drain through the apertures 29 until essentially only the retainment basin 25 is filled with the retained liquid 47 as shown in FIG. 2. Because the retainment basin 25 is impermeable to liquids, the retained liquid 47 remains in the retainment basin 25 regardless of how low the level L drops below a level L2 corresponding to a an upper edge of the retainment basin 25. In consequence, the sensor 1 remains immersed in the liquid retained in the retainment basin 25 and measures the variable of the retained liquid.

When new liquid is supplied to the measurement site from a source located above the containment device 23 as indicated by the arrows 49 in FIG. 2 in the measurement situation shown in FIG. 2, where the level L is below the containment device 23, the liquid dropping into the retainment basin 25 from above will essentially replace at least some or even all liquid previously retained in the retainment basin 25. At the same time, the apertures 29 enable any excess liquid to exit the containment device 23. This exchange of liquid provides the advantage of enabling the sensor 1 to measure the variable of the newly supplied liquid without requiring for the level L of the liquid at the measurement site to rise above the level L2 corresponding to the upper edge of the retainment basin 25.

When the supply of liquid provided to the measurement site exceeds the liquid withdrawn from the measurement site, this causes the level L of the liquid to rise. In case the rising level L exceeds a height of a lower edge of the lowest aperture(s) 29 corresponding to the upper edge of the retainment basin 25, liquid is exchanged between the retainment basin 25 and a surrounding of the containment device 23 through the apertures 29. This exchange of liquid through the apertures 29 is continuous even when the containment device 23 is fully immersed in the liquid. Even though the exchange rate of liquid exchanged through the apertures 29 is slower than the exchange rate achieved by liquid dropping into the containment device 23 from above, when the level L is below the upper edge of the retainment device 25, it is still sufficiently large to ensure that changes of the variable of the liquid outside the containment device 23 lead to a corresponding change of the variable of the liquid contained in the retainment basin 25. Correspondingly, this exchange enables the sensor 1 to measure the variable of the liquid surrounding the containment device 23 when the level L exceeds the upper edge of the retainment basin 25, as well as when the containment device 23 is fully immersed.

The systems of the present disclosure provide the advantages mentioned above. Individual components of the system, as well as individual steps of the method, can be implemented in different ways without deviating from the scope of the present disclosure.

In at least one embodiment, the containment device 23 may be a container, e.g., a bucket or a box, e.g., a square or rectangular box. Regardless of the shape of the container, the container may be a metal container, a stainless steel container or a plastic container. In certain embodiments, the apertures 29 may be cut or drilled into the side wall of the top section 27. This provides the advantage that the containment device 23 can be easily manufactured at low cost.

In at least one embodiment, the sensor support 3 may be installed at the fixed sensor support position at the measurement site such that the sensor 1 is spaced apart from a base 49 of the retainment basin 25 by a distance d larger or equal to a predetermined minimum distance, e.g., a distance d larger or equal to a minimum distance of 2 cm or a distance d larger or equal to a minimum distance of 5 cm. In such an embodiment, a height Hb of the retainment basin 25 may be selected such that it exceeds a height of a front end of the sensor that needs to be exposed to the liquid during the measurement by at least the minimum distance.

The distance d between the sensor 1 and the base 49 of the retainment basin 25 provides the advantage that measurements performed by the sensor 1 are essentially unaffected by the presence and/or the material of the retainment basin 25. In addition, positioning the sensor 1 spaced apart from the base 49 of the retainment basin 25 provides the advantage that the resulting gap between the sensor 1 and the base 49 constitutes a flow channel of sufficient size supporting a comparatively fast exchange of liquid through the gap.

A height Ht of the top section 27 can be dimensioned independently of the height Hb of the retainment basin 25. As an example, the height Ht of the top section 27 may be larger or equal to the height Hb of the retainment basin 25. Increasing the height Ht of the top section 27 increases the mass of the containment device 23. This is especially advantageous in applications where the containment device 23 is secured in its device position by gravity.

In an additional or alternative embodiment, the containment device 23 may be selected such that a volume of an interior of the containment device 23 given by a sum of a volume of an interior of the top section 27 and a volume of an interior of the retainment basin 25 is larger or equal to 5 liters and/or smaller or equal to 50 liters and/or such that the containment device 23 has a cross-sectional area of 0.05 m$^2$ to 0.5 m$^2$.

Figure 7:
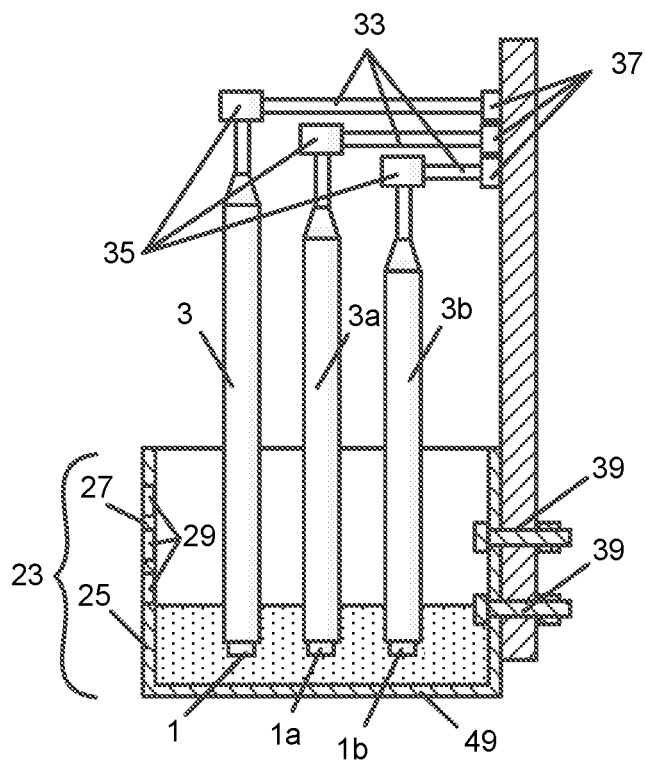
FIG. 7 shows a system including at least two sensors.

In at least one embodiment, the system may include at least one additional sensor 1 located on an end section of an additional elongated sensor support 3. This is illustrated in FIG. 7 showing the measurement system of FIG. 1 additionally including two additional sensors 1a, 1b, each located on an end of one of the two additional sensor supports 3a, 3b. Each additional sensor 1a, 1b is embodied to measure an additional variable of the liquid. As an example, the additional sensors 1a, 1b may include at least one sensor given by one of the types of sensors listed above as examples for the sensor 1 shown in FIGS. 1 and 2.

In addition, the system further includes at least one fastener for each additional sensor support 3a, 3b embodied to mount the respective additional sensor support 3a, 3b in a fixed sensor support position in relation to the fixed device position of the containment device 23 such that the respective additional sensor 1a, 1b is located inside the retainment basin 25. As in the embodiment shown in FIGS. 1 and 2, for each additional sensor support 1a, 1b the fasteners may include the suspension beam 33, the fastener 35 for mounting the respective additional sensor support 3a, 3b on the suspension beam 33 and the fastener 37 for mounting the suspension beam 33 at the measurement site. In an certain embodiments, two or more of the sensor supports 3, 3a, 3b of the system can be mounted onto the same suspension beam or at least one of the sensor support 3 and the at least one additional sensor support 3a, 3b may be mounted directly onto a site support, like the site support 41a shown in FIG. 5, located above the measurement position where the measurements are to be performed by the respective sensor 1.

Mounting each of the sensor support 3 and the at least one additional sensor support 3a, 3b individually provides the advantage that each sensor 1, 1a, 1b can be removed from the measurement site, e.g., for servicing and/or recalibrating the sensor 1, 1a, 1b without requiring any of the other sensors 1, 1a, 1b to be removed from the measurement site.

Systems including two or more sensors 1, 1a, 1b provide the advantage that a corresponding number of different variables can be measured and that only a single containment device 23 having a correspondingly large cross-sectional area is required to ensure that all the sensors 1, 1a, 1b employed are always immersed in a wet environment inside the retainment basin 25.

The invention claimed is:

1. A system for measuring a variable of a liquid, the system comprising:
a sensor disposed on an end section of an elongated sensor support, the sensor configured to measure the variable, wherein the sensor includes a sensor element;
a containment device that is open at a top thereof as to enable the liquid to enter the containment device, the containment device including:
a bottom section defined by a liquid impermeable retainment basin, which defines a basin volume configured to retain the liquid in relation to gravity;
a top section having a side wall surrounding an interior of the top section; and
apertures extending through the side wall of the top section; and
fasteners configured to mount the sensor support in a fixed sensor support position at a measurement site in relation to a fixed device position of the containment device such that the sensor element of the sensor is disposed within the basin volume.

2. The system of claim 1, wherein the apertures include at least one of: at least one hole, at least one slot, at least one horizontal slot, at least one vertical slot, and apertures of a grid constituting at least a fraction of the side wall of the top section.

3. The system of claim 1, wherein the apertures are distributed over a height and a circumference of the side wall of the top section.

4. The system of claim 1, wherein:
the containment device is a container, a bucket, a box, a square box or a rectangular box;
the total volume of an interior of the containment device is larger or equal to 5 liters and/or smaller or equal to 50 liters;
the containment device has a cross-sectional area of 0.05 m$^2$ to 0.5 m$^2$; and/or
the sensor support is a tube, a pipe or a rod supporting the sensor attached to the sensor support.

5. The system of claim 1, wherein the containment device is a metal container, a stainless steel container or a plastic container.

6. The system of claim 1, wherein a height of the retainment basin exceeds a height of a distal end of the sensor by at least a minimum distance of 2 cm such that the distal end of the sensor is immersed in the liquid during a measurement operation of the system.

7. The system of claim 1, wherein a height of the top section is larger or equal to a height of the retainment basin.

8. The system of claim 1, wherein the sensor element includes an ion-selective membrane adapted to be operated in a wet environment and adapted to be exposed to the liquid during measurement.

9. The system of claim 1, wherein the sensor is one of:
an electrochemical sensor;
a potentiometric sensor configured to measure an activity or a concentration of an analyte contained in the liquid;
a potentiometric sensor configured to measure a pH-value of the liquid; and
an amperometric sensor configured to measure a concentration of dissolved oxygen.

10. The system of claim 1, additionally comprising:
at least one additional sensor disposed on at least one end section of an additional elongated sensor support, wherein each additional sensor is configured to measure an additional variable of the liquid; and
at least one fastener for each additional sensor support configured to mount each respective additional sensor support in a fixed sensor support position in relation to the fixed device position of the containment device such that the at least one additional sensor located on the end section of the respective additional sensor support is disposed inside the basin volume.

11. The system of claim 1, wherein the sensor is configured to measure an oxidation reduction potential of the liquid.

12. The system of claim 1, wherein the apertures are configured to enable the liquid to pass therethrough and adapted as to exchange the liquid between the retainment basin and a surroundings of the containment device through the apertures.

13. A method of operating the system of claim 1 at a measurement site, the method comprising:
    installing the sensor support at the fixed sensor support position at the measurement site and installing the containment device at the fixed device position at the measurement site such that the sensor is disposed inside the retainment basin;
    during or following the installation, at least once filling the containment device or at least the retainment basin with the liquid to be measured; and
    measuring the variable of the liquid using the sensor and providing a corresponding measurement result.

14. The method of claim 13, wherein:
    installing the sensor support includes mounting the sensor support onto a suspension beam mounted onto a site support provided at the measurement site or mounting the sensor support onto the site support located above a measurement position where measurements are to be performed by the sensor; and
    installing the containment device includes:
        mounting, screwing or welding the containment device onto the site support provided at the measurement site such that the site support is disposed to one side of the containment device; or
        mounting, screwing or welding the containment device onto a top side of the site support or a top side of a base, a floor or a concrete floor of a tank or another type of vessel or container; or
        positioning the containment device on the top side or in a recess of the site support or a liquid permeable grid such that the containment device in held in place in the fixed device position either by gravity or by gravity and a shape of the site support.

15. The method of claim 13, wherein the sensor support is installed at the fixed sensor support position such that the sensor is spaced apart from a base of the retainment basin by a distance larger or equal to a minimum distance of 2 cm.

16. The method of claim 13, further comprising:
    at least once exchanging at least some or all of the liquid retained in the retainment basin while a level of the liquid at the measurement site is below the containment device by supplying liquid to the measurement site from a source above the containment device such that the supplied liquid drops into the containment device; and
    measuring the variable of the supplied liquid using the sensor.

17. The method of claim 13, further comprising at least once measuring the variable of the liquid using the sensor while the containment device is immersed in the liquid, wherein the liquid is exchanged between the retainment basin and a surrounding of the containment device through the apertures.

\* \* \* \* \*